United States Patent
Kulathu et al.

(10) Patent No.: US 9,496,754 B2
(45) Date of Patent: Nov. 15, 2016

(54) METHOD AND SYSTEM FOR POWER MANAGEMENT

(75) Inventors: Ganesh Kulathu, Bangalore (IN);
Arinjai Gupta, Bangalore (IN);
Diogenis Papaevangelou, Oslo (NO);
Willem Otto Van Der Wal, Naarden (NL); Wolfgang Wimmer, Rietheim (CH); Martin Nykvist, Singsby (FI)

(73) Assignee: ABB Schweiz AG, Baden (CH)

( * ) Notice: Subject to any disclaimer, the term of this patent is extended or adjusted under 35 U.S.C. 154(b) by 37 days.

(21) Appl. No.: 13/414,258

(22) Filed: Mar. 7, 2012

(65) Prior Publication Data

US 2012/0226386 A1 Sep. 6, 2012

Related U.S. Application Data

(63) Continuation of application No. PCT/IB2010/000001, filed on Jan. 5, 2010.

(51) Int. Cl.
*G06F 1/26* (2006.01)
*H02J 13/00* (2006.01)
*H02J 3/14* (2006.01)

(52) U.S. Cl.
CPC ............. *H02J 13/0079* (2013.01); *H02J 3/14* (2013.01)

(58) Field of Classification Search
None
See application file for complete search history.

(56) References Cited

U.S. PATENT DOCUMENTS

| | | | |
|---|---|---|---|
| 6,832,135 B2 * | 12/2004 | Ying | 700/295 |
| 7,356,422 B2 * | 4/2008 | Schweitzer, III | 702/60 |
| 7,373,222 B1 * | 5/2008 | Wright et al. | 700/295 |
| 2002/0108065 A1 * | 8/2002 | Mares | 713/300 |
| 2002/0169523 A1 * | 11/2002 | Ross et al. | 700/286 |
| 2004/0133814 A1 * | 7/2004 | Lavoie et al. | 713/300 |
| 2005/0116814 A1 * | 6/2005 | Rodgers | H02J 3/14 340/538 |
| 2007/0055889 A1 * | 3/2007 | Henneberry et al. | 713/186 |
| 2007/0206644 A1 * | 9/2007 | Bertsch et al. | 370/503 |
| 2008/0100436 A1 * | 5/2008 | Banting et al. | 340/539.22 |
| 2009/0187282 A1 * | 7/2009 | Menke et al. | 700/287 |
| 2009/0254655 A1 * | 10/2009 | Kidwell et al. | 709/224 |
| 2010/0332047 A1 * | 12/2010 | Arditi et al. | 700/298 |

FOREIGN PATENT DOCUMENTS

| | | |
|---|---|---|
| WO | WO 03/049248 | 6/2003 |
| WO | WO 2008/052162 | 5/2008 |

OTHER PUBLICATIONS

International Search Report (PCT/ISA/210) issued on May 25, 2010, by IB Patent Office as the International Searching Authority for International Application No. PCT/IB2010/000001.

* cited by examiner

*Primary Examiner* — Sean Shechtman
(74) *Attorney, Agent, or Firm* — Barnes & Thornburg LLP

(57) ABSTRACT

A method and a system for power management for a plant electrical network are provided. The power management system over a plant-wide communication network includes both concepts of hierarchical level and distributed level power management using multiple controllers. At least one controller in the power management system is configured for power management in a first local process area within the plant electrical network and is capable to communicate with at least a second controller configured for power management in a second local process area within the plant electrical network over the communication network.

22 Claims, 7 Drawing Sheets

METHOD AND SYSTEM FOR POWER MANAGEMENT

RELATED APPLICATION

This application claims priority as a continuation application under 35 U.S.C. §120 to PCT/IP2010/000001, which was filed as an International Application on Jan. 5, 2010 designating the U.S., and which claims priority to Indian Application 2152/CHE/2009 filed in India on Sep. 7, 2009. The entire contents of these applications are hereby incorporated by reference in their entireties.

FIELD

The present disclosure relates generally to the field of power management systems, and more specifically to power management in process industries.

BACKGROUND INFORMATION

An electrical or power substation involves electricity transmission and distribution systems where voltage is transformed from high to low or the reverse using transformers. Electric power may flow through several substations between generating plant and consumer or load, and the voltage may be transformed in several steps.

Industrial setups involve intense energy consumption and include one or multiple dedicated substations including both upstream substation connecting to the main source of power (either the grid or the in-house generator) and downstream substations for distribution of power to different load centers distributed over various parts of industries. In addition, the industry may have its own generation system to meet its energy demand and also have power management system for effectively handling power for its purpose.

Power management functionality includes load shedding, power and voltage control, power restoration, power source synchronization etc. that depend on measurements like voltage, current, power and other power-quality parameters for effective handling of power demands for various equipment and processes, power fluctuations, equipment constraints etc. It is becoming common to find these kinds of power management needs within industrial setups like process industries such as refineries and power utilities. However, such setup is also applicable to other process industries such as cement, pulp and paper, petrochemical plants, fertilizers, steel, mining and metals, water and waste water treatment plants etc.

The substations (both upstream and downstream) can include equipment such as several power and distribution transformers, cabling, switching, reactive power and grounding equipment. This equipment should be protected against power system anomalies like power surges, power system faults etc. This can be addressed by Intelligent Electronic Devices (IEDs) that provide different comprehensive protection and monitoring functions. Besides protection and monitoring functions, IEDs also offer metering and control functions. The IEDs are microprocessor-based devices that are associated with power system equipment, such as circuit breakers, generators, transformers, power lines, power cables, reactors, motors, capacitor banks etc. The IEDs can receive primary power system information like voltage and current from sensors to perform various protection and monitoring functions. Exemplary types of IEDs include protective relaying devices, load tap changer controllers, circuit breaker controllers, recloser controllers, voltage regulators, secondary function (like load shedding etc, where the load shedding functionality is implemented in an IED and process data exchange for such a functionality is done by the primary IEDs that directly interface with the power system equipment, controllers etc.). Thus, an IED can perform several power system functions depending on its purpose.

Substation automation can be an important and complex aspect to solve the power system function tasks, using state of the art technologies. By doing so, Substation automation also provides value added features to perform automatic control based on power system conditions/events, equipment maintenance, communication of substation information to higher level control systems like Grid Control Centers etc. Through the Substation automation, manual and automatic control command functions are provided like closing and opening of switching equipment (circuit breakers and disconnectors), or raising/lowering voltage levels in order to maintain the desired voltage levels. Multiple communication protocols exist for substation automation, which include many proprietary protocols with custom communication links. However, interoperation of devices from different vendors is highly desired for simplicity in implementation and use of substation automation devices.

The IEC61850 standard from International Electrotechnical Commission (IEC) advocates interoperability amongst Intelligent Electronic Devices (IEDs) from various manufacturers using common engineering models (for example, IEC61850 Common Engineering Model using Logical Nodes), data formats and communication protocol. Recent IEDs are therefore designed to support the IEC61850 standard for substation automation, which provides interoperability and advanced communications capabilities like GOOSE (Generic Object Oriented Substation Event) and MMS (Manufacturing Message System) communication profiles.

The power management functionality like load shedding, is currently implemented as a centralized function in the substation automation systems for process industries like refineries, petrochemical plants, steel plants, cement, pulp and papers etc. The load shedding or shedding of load referred herein can involve cutting off the power on certain lines/loads, when the power demand becomes greater than the power supply. This can take place on the occurrence of a power system fault or an event that would affect the power available to feed the processes in an electrical network.

Centralized implementation of the above function, for example, implemented in a single process controller IED and deployed at the upstream substation, has several short comings. For example, centralized function implementation causes high loading due to centralization of all functions for the complete power system network, where load shedding is to be deployed. It also results in high and sustained levels of communication loads in the process controller IED, as it would collect desired data from downstream IEDs for execution of the centralized function. This leads to lower availability of the process controller IED for other activities. Since the downstream IEDs are directly connected to the central process controller, it is directly exposed to the complexity of the substation configurations and connectivity.

Further, there are limitations in coverage in case of high number of islanded networks (power network that gets isolated from upstream substation due to a fault in the network) in the substation as only a particular number of islands can be handled by the centralized controller. The undetected islands are thus left vulnerable to system disturbances, without the 'coverage' of the centralized load shedding function.

Also, overload situations in a downstream transformer cannot be easily detected in the centralized implementation and hence there may be no facility for downstream substation slow load shedding to lessen overloading on the transformers. The loads can be manually shut down due to lack of any intelligent load shedding action in the downstream substation. This results in a lack of discrete isolation of loads, thereby lessening system availability.

Hence the present disclosure is directed to, for example, a power management system and technique that allows for improved and distributed power management as an alternative and efficient solution against central power management systems and methods currently available.

SUMMARY

A power management system is disclosed for a plant electrical network including power distribution equipment, power actuators, local generators and loads of an industrial plant, the system comprising: a plant-wide communication network: and a plurality of controllers for power management in the plant electrical network, wherein a first controller from the plurality of controllers is configured for power management in a first local process area within the plant electrical network and for communication over the communication network, with at least a second controller from the plurality of controllers configured for power management in a second local process area within the plant electrical network.

A method is also disclosed for power management in a plant electrical network including power distribution equipment, power actuators, local generators and loads of an industrial plant, using at least two controllers communicatively interconnected via a plant-wide communication network and being configured for power management in at least two local process areas within the plant electrical network, respectively, the method comprising: (a) deciding an operation mode for at least one controller from the at least two controllers as (a) a remote control mode or (b) a complete autonomous mode or (c) a partial autonomous mode; (b) performing power balance computations for respective local process areas by the at least two controllers in accordance with the operation mode of the at least one controller; and (c) performing power management based on results of power balance computations in the respective local process areas associated with the at least two controllers.

A device is also disclosed comprising: means for power management in a plant electrical network in a first local process area within the plant electrical network; and means for communicating, over a plant-wide communication network, with at least one other device configured for power management in the plant electrical network in a second local process area.

BRIEF DESCRIPTION OF THE DRAWINGS

These and other features, aspects, and advantages of the present disclosure will become better understood when the following detailed description is read with reference to the accompanying drawings, wherein.

DETAILED DESCRIPTION

Figure 1:
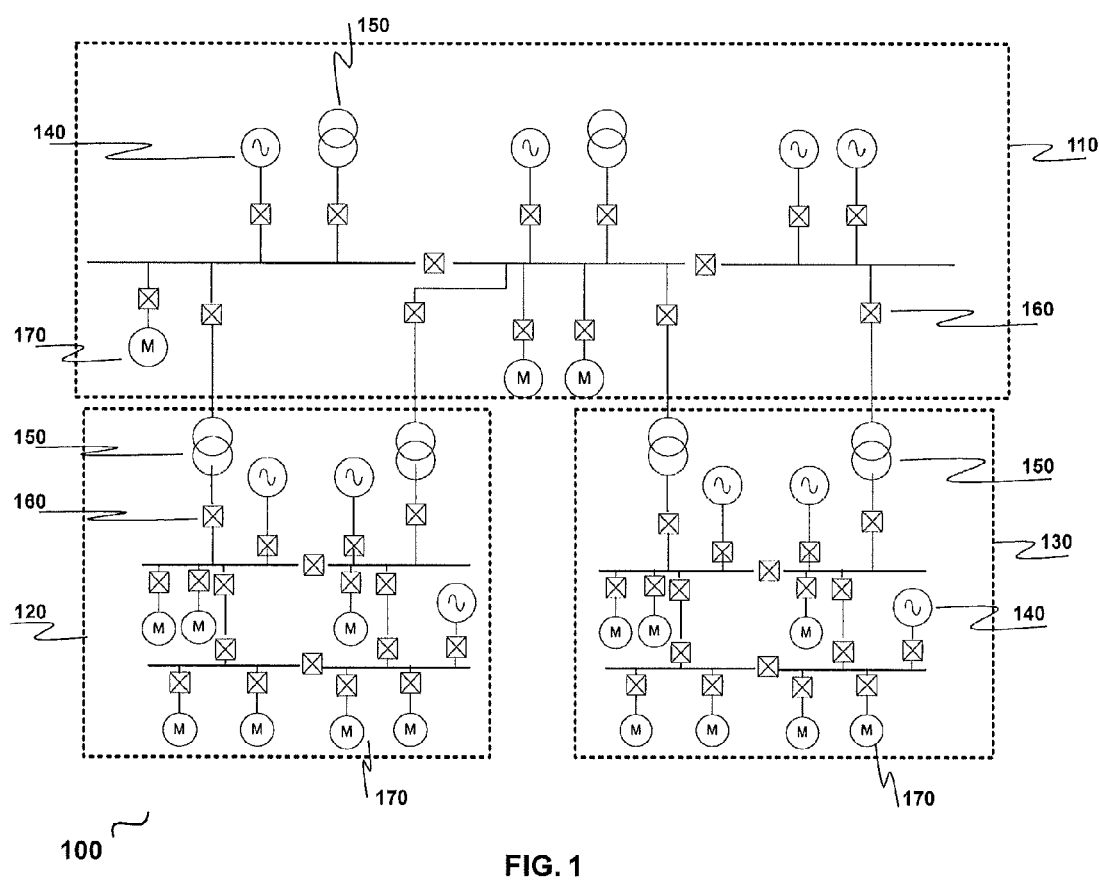
FIG. 1 is an exemplary electrical Single Line Diagram depicting the different process areas associated with respective substations.

According to an exemplary aspect, a power management system for a plant electrical network is provided. The power management system includes both concepts of hierarchical level and distributed level power management using multiple controllers in a plant-wide communication network. In one embodiment, at least one controller in the power management system is configured for power management in a first local process area within the plant electrical network and is capable to communicate with at least a second controller configured for power management in a second local process area within the plant electrical network over the communication network. The controllers may be distributed in one or more hierarchical levels.

In another embodiment, the power management system includes at least one controller configured as a Central Controller to perform power management functions in conjunction with at least one controller (referred as Local Controller) from the multiple controllers in their respective local process areas wherein, the Central Controller communicates one or more power management commands to at least one Local Controller.

In yet another embodiment, the power management system includes at least one local controller that operates in complete autonomous mode for power management in its local process area performing power balance calculations and power management functions for the part of electrical network associated with its local process area.

In yet another embodiment, the power management system includes at least one local controller that operates in partial autonomous mode for power management in its local process area performing power balance calculations and power management functions in autonomous mode for at least one part of electrical network (eg. Islanded or isolated network) in its local process area and the other parts of electrical network in its local process area managed in conjunction with the central controller (remote control mode).

In yet another embodiment, the power management system includes a controller (eg Central Controller) configured for direct control in its local process area as well as indirect control in local process areas associated with at least one another controller (Local Controller).

In yet another embodiment, the power management system includes one or more power management functionalities for load shedding including slow load shedding, manual load shedding, power balance computations and issue of priorities to carry out a power management function.

According to another aspect, an exemplary method for power management in a plant electrical network is provided as one embodiment with use of at least two controllers that are connected via plant-wide communication network. The method can include deciding an operation mode for at least one controller from the at least two controllers as (a) a remote control mode or (b) a complete autonomous mode or (c) a partial autonomous mode. The decision may be a result of initial configuration or as a result of a contingency in the plant electrical network requiring change in the operation mode of at least one controller. The method can include performing power balance computations for respective local process areas by the at least two controllers in accordance with the operation mode of the at least one controller; and performing power management in the respective local process areas associated with the at least two controllers.

In another embodiment, a change in operation mode during contingency is for a local controller that changes its mode from remote control mode to complete autonomous mode or to a partial autonomous mode depending on the nature of the contingency.

In yet another embodiment, a method for power management is based on priority associated with local process areas or that of the loads in the local process areas.

According to yet another aspect, a device (e.g., controller) for power management in a plant electrical network is provided. The controller can be adapted and configured for power management in a first local process area within the plant electrical network and capable of communicating, over a plant communication network, with a second controller or device configured for power management in the plant electrical network in a second local process area.

The systems and techniques described herein can thus provide unique power management solutions. Load shedding has been described herein as an exemplary power management functionality, however the same concept can be extended to other functions like power control, load restoration, sequential starting etc. in industrial set-ups. Similarly, process industry has been used herein as a non-limiting example of where such power management solutions can be applied.

The systems and techniques described herein can include providing additional process controllers, the Local Controllers, for local power management as desired to function in hierarchical manner with a process controller designated for overall plant level power management. The designated process controller for overall plant level power management is referred herein as Central Controller. Further, the system and technique described herein are also applicable in a distributed power management environment where there is no designated Central Controller as such, the power management being done at local levels by Local Controllers and they communicate with each other for any power balance situations. The technique can be based on Open Communication Standards (OCS) like IEC61850-MMS and IEC61850-GOOSE.

With reference to load shedding, overall plant load shedding is associated with a plant electrical network that could comprise of one or multiple upstream and downstream substations that are geographically concentrated or distributed. In other words, the plant level load shedding functionality as referred herein relates to load shedding in the substations handled through direct control of Central Controller and through appropriate coordination with one or more additional process controllers (Local Controllers) for local load shedding in substations. The plant electrical network also includes power distribution equipment (e.g. transformers, circuit breakers etc.), power actuators (e.g. drives for breaking operation in circuit breaker etc.), and substation automation products (e.g. process controller, IED, network communication accessories etc.). The power actuators for power management application may operate to shed or connect loads as well as local generators.

The local load shedding as referred herein is load shedding in a local process area. For example, the loads are shed in downstream substation(s) under a process plant. The local process area as referenced herein can include power sources (transformer connection to grid or upstream substations or other energized networks), local generation systems and local loads and the loads are shed or connected in the local process area under control of the power management device or controller. Further, a local process area may be associated with a part of substation (in case of a large substation) or completely with one substation (medium size substation) or multiple substations (small size substation).

Local loads may include different process equipments like variable speed drives for industrial motors, compressors, pumps, furnaces etc. The energization/de-energization of these loads can be controlled by IEDs through circuit breakers.

Local island network as described herein is defined as a part of plant electrical network and may exist as a local process area that is electrically isolated from the rest of the power electrical network and therefore does not contribute in power balance of the overall process plant.

The power balance and power balance principles as described herein refer to balancing of supply from a generator and transformer (connected to upstream substations/grids) side and demand from the load side of power in the process plant. The power balance calculations as used herein below refer to known calculations for electrical networks and components to achieve the power balance.

Now turning to the drawings, FIG. 1 is an electrical Single Line Diagram 100 depicting three local process areas in an exemplary plant electrical network. One of the local process areas, for example a first local process area 110 is associated with an upstream substation and the other two local process areas, a second local process area 120, and a third local process area 130 are associated with downstream substations. This exemplary depiction is also used to describe a system and technique as disclosed herein. FIG. 1 also depicts major components in the process area such as generators 140, transformer connections 150, circuit breaker or switches 160 and electrical loads 170. It should be understood, that three process areas are shown herein for ease of explanation but the system may have multiple such process areas.

Figure 2A:
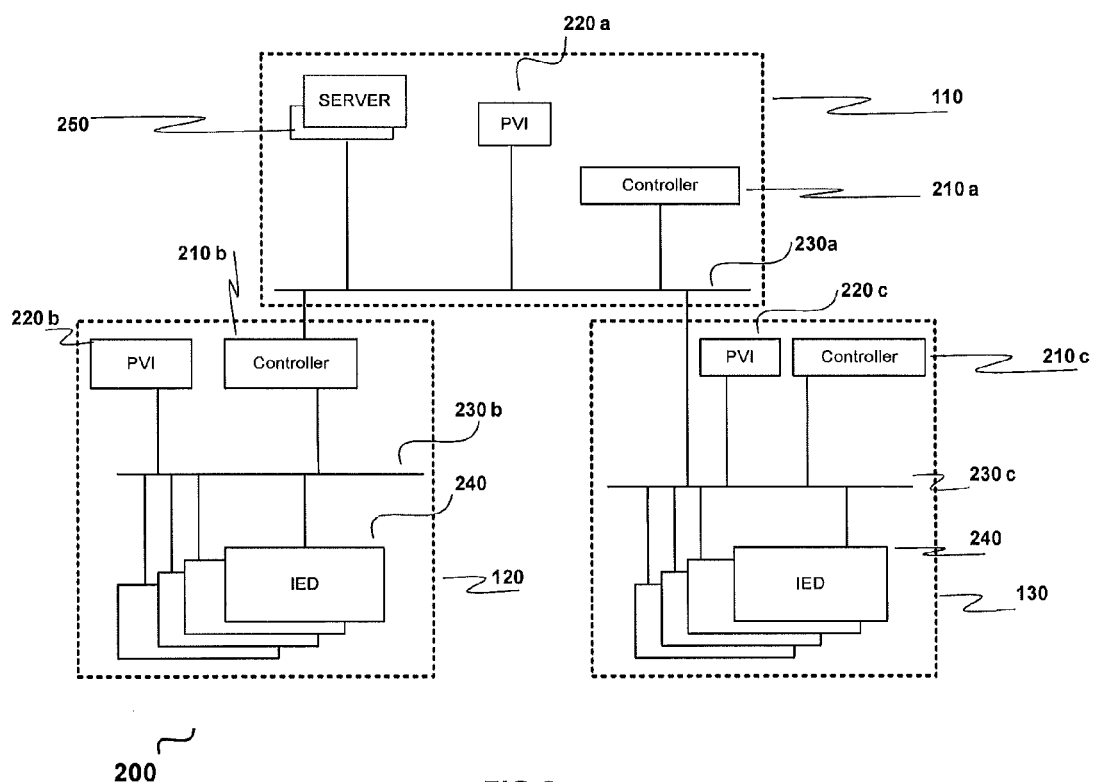
FIG. 2a and FIG. 2b are block diagram representations of power management system as an exemplary embodiments.
Figure 2B:
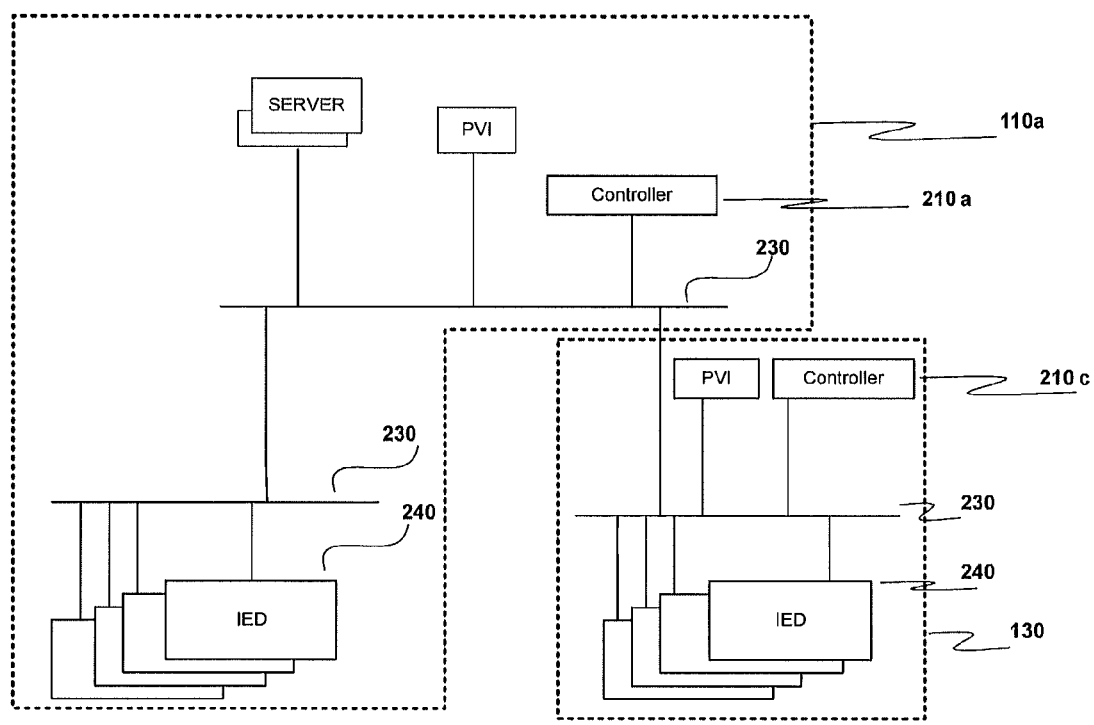

FIG. 2a and FIG. 2b describe exemplary implementations of the load shedding system as examples for power management system for a particular functionality that includes both local load shedding aspects along with centralized load shedding. With reference to FIG. 2a, a load shedding system 200 includes more than one controllers (210a, 210b, 210c) to control the plant electrical network. In a specific embodiment, at least one controller (210a) is configured as Central Controller (CC) for plant level power management. The load shedding system 200 also includes a plant level process visualizing interface (PVI) 220a for plant process visualization that is connected to the Central Controller 210a. It may be noted here that the Central Controller 210a, here in the exemplary implementation is associated with the first local process area 110 associated with an upstream substation (local process areas also depict the associated substations and therefore a separate reference numeral for substations is not being used) connected with the main power generation sources and public grid connectivity. The association of the local process area with a controller and the scope of the local process area may be explicitly carried out as a definition in the controller configuration or inferred from the configuration files of the controller based on the substation equipment under control of the controller. FIG. 2b describes another exemplary implementation of the load shedding system to illustrate the Central Controller configured for a local process area 110a that includes a upstream substation and a downstream substation. It is to be noted that the local process area may be defined or configured to include multiple substations and alternatively a substation may include multiple local process areas.

The load shedding system 200 also includes several other Controllers Local Controllers (LCs), for example a second controller 210b, a third controller 210c and associated local PVI 220b, 220c for local process visualization. It may again be noted that each Local Controller is configured for controlling local process areas (120,130) in downstream substations. The Central and Local Controllers 210a, 210b, 210c are configured using a suitable Engineering and Configuration Tool for power management functions.

The process visualizing interfaces 220a, 220b, 220c are human machine interfaces (HMIs) that allow the operators/users at the process plants to view the key functions, monitor, control and configure the substation activities. The HMI associated with the CC (e.g., the PVI 220a as described herein) displays the industrial plant wide load shedding function and a summary of an individual downstream substation load shedding function. Due to the presence of a local HMI (could be web based) module (e.g., PVI (220b, 220c)) along with the respective LC the user can monitor and parameterize the downstream substation load shedding function from the substation itself and if desired, initiate actions to inhibit or block load shedding for individual loads.

The downstream substations in the local process areas 120, 130 are connected (electrically through transformers or tie lines) to the upstream substation associated with the first local process area 110 at, for example, a higher voltage level. The power generation, transformers and loads are distributed at both downstream substation level and at the higher voltage level(s) at the upstream substation level. The connection to a downstream substation could also be from the adjacent substation or an external grid connection.

Referring again to FIG. 2a, the load shedding system 200 also depicts the network connectivity through a plant-wide communication network 230 (LAN) connecting the various substation automation devices in a suitable manner (e.g. 230a, 230b, 230c). The controller 210b is depicted to be connected to LAN 230a and 230b, different in the manner compared to the LAN connection of the controller 210c to illustrate the variety in practice of structuring distributed control systems. FIG. 2a therefore, is to be treated only as an exemplary embodiment. Further the load shedding system 200 also includes the downstream substation IED sets 240 and one or more servers 250 to support engineering, communication connectivity and to provide various plant level services connected with power management system. As will be understood to those skilled in the art, the downstream substations at local process areas 120, 130 may also include generation units, external grid connectivity, connectivity to other power networks, islanded electrical networks and local loads controlled by IEDs 240.

The plant level load shedding function information that includes for example but not limited to, the accumulated load information across different downstream substations, connectivity information about upstream to downstream substations electrical and communication connectivity, summated available power information from downstream and upstream substations etc., is processed by the Central Controller 210a and is available on the process visualizing interface 220a.

Similarly local load shedding function information processed by Local Controllers 210b, 210c which includes local load shedding information related to downstream substation, network configuration information, available power from power sources (generators and transformers connected to upstream substations/grids etc) and loads power consumption information per priority, is displayed on the process visualizing interface 220b and 220c.

The priorities information can be process priority information for power management functions. For example, for load shedding functionality this priority is referred to as load priorities or load shedding priorities; for power control as preferred modes for a generator; for power restoration as reconnecting priority for a load etc.

The load shedding priorities as used herein refer to priorities for shedding different loads associated with the upstream and downstream substations based on their power consumption, functional criticality etc. Also, the load shedding priority is defined for a load or feeder that is to be shed/tripped during a system disturbance or fault (contingency).

In an exemplary embodiment, the priority definition is done as a number (1 . . . 20 or 1 . . . 50 etc), depending on the importance of the load, for example '1' being assigned to the lowest priority load/feeder and '20' or '50' assigned to the most important ones in the plant. It may be noted here that the same load shedding priority can be assigned to one or more loads/feeders in a substation. Also, there could be one or more substations assigned to a LC. Hence, there could be the same priority numbers across different substations as well. However, for load shedding functionality by the LC at downstream substation level or CC at plant level, this appears as a single consolidated data (power consumption of a load) per priority. This implies that there is consolidated power value for each priority from 1 to 20 or 50 calculated at LC (at downstream substation level) or CC (at plant level overlooking at many downstream substations). Hence all the identical priority loads' data is summated and presented as a single 'lumped/consolidated' priority data for the CC from LCs.

In a more specific example, PVI at the plant level can display the following information:
Plant wide electrical network summary for Load Shedding
Plant wide load shedding status
Communication status between CC and LCs
Upstream power sources and outgoing feeders' (to downstream substations) data
Downstream substation electrical connectivity status
Downstream substation data including substation identity and electrical network status data (circuit breaker status, generator power information etc). Summated data for loads across various downstream substations, against every priority Similarly, in a more specific example, data displayed on PVI at the local process area includes:
Downstream substation electrical network summary for Load Shedding
Downstream substation summated data for loads against every priority
Downstream substation power sources and outgoing feeders load shedding data
Downstream substations not participating in load shedding
Downstream substation network circuit breaker status along with network identity
Downstream substation load shedding status
Downstream substation power connectivity to upstream substation
Downstream substation identity Downstream substation LC communication status with CC The communication support and data modeling (e.g., using IEC61850 Logical Node data modeling definitions) for plant level PVI with LC, CC and other Protection and Control IEDs can be done using an IEC61850 MMS profile. The LCs and CC can communicate using the IEC61850 GOOSE profile. The LCs and the Protection and Control IEDs in the downstream substations can communicate using the IEC61850 GOOSE profile. This communication and data modeling can ensure that all process data (information) uses IEC61850 communication profiles, without the need for any proprietary (vendor specific/non standard protocols) mode of communication.

According to exemplary aspects of the present technique, the LC collects load shedding information, pertaining to its downstream substation, from the IEDs connected to different loads in that substation. It assimilates this information and then prepares a consolidated local load shedding information to be sent to the CC.

In the initial state, the CC receives data of downstream substation information. Exemplary data from the LC to CC:
  Downstream substation identification
  Downstream substation load shed functionality in "LC/CC" control
  Downstream substation feeders not participating in load shedding
  Downstream substation load shed functionality status
  Downstream substation electrical network information including power delivery capability information, actual power delivery, circuit breaker information, load data along with priorities.

The CC processes the information from both upstream and downstream substations and issues load shedding actions or priorities for LC (through IEC61850 Communication status and connectivity between upstream/downstream substations).

At the initial state the following are examples of the data communication from CC to LC:
  Downstream substation number where load shedding needs to take place
  Load Shed priority command for all downstream substations (LCs) connected to CC
  Electrical connectivity status between upstream and downstream substations
  LC's operational status (operating in complete autonomous mode or in partial autonomous mode or complete remote control mode)

Under steady state, when a LC and CC are connected (upstream and downstream substations are connected or the communication network LC and CC are connected on the Plant-wide LAN on IEC61850), the downstream substation is 'unified' with the rest of the plant electrical network in the load shedding functionality. Here, the downstream substation load shedding functionality is in remote control mode, controlled by the CC (LC operates in conjunction with the CC).

The CC keeps a tab of downstream substations that are 'connected' to upstream substations and receives downstream substation's load shedding functionality information from respective LCs. The CC does a plant wide load shed calculation based on the information received. The plant wide power balance calculation is based on:
  [Σ power from upstream power sources+Σ power from all downstream substation power. sources]−[Σ load consumption from all downstream substation loads+Σ load consumption from upstream substation+Σ unavailable loads for LS in upstream substation+Σ unavailable loads for LS in downstream substations]

Under steady state, when the upstream and downstream substations are electrically disconnected or LC and CC are communication wise disconnected from each other, the downstream substation is 'disconnected' from the rest of the plant electrical network in the load shedding functionality. Here, the downstream substation's load shedding functionality is in local control mode (autonomous mode), controlled by the LC.

If the local control mode is due to a power disconnection, the disconnected island(s) in the downstream substation ceases to participate in the plant wide load shedding functionality. The CC does plant wide power balance calculation for the rest of the network except the disconnected island(s) in the downstream substation (as it does not see any power flow into the isolated downstream substation). The LC does a downstream substation load shed calculation, that is, a downstream substation load shed power balance calculation based on
  [Σ power from the downstream substation's power sources]−[Σ load consumption from the downstream substation loads+Σ unavailable loads for LS in downstream substation]

If the local control mode is due to a communication failure, the disconnected island(s) in the downstream substation ceases to participate in the plant wide load shedding functionality. The downstream substation(s) cease to participate in the plant-wide LS functionality. The LC does not send any updated information to the CC (due to the communication failure). The CC senses this and discards 'old data' from the LC for plant-wide LS calculations. The LC also discards data from CC for its local LS calculation.

Under contingencies, the actions at CC and LC and communication between them involves the following example scenarios Contingency Example 1

Upstream and downstream substations are connected or LC and CCs are connected on the Plant-wide LAN on IEC61850 and a contingency occurs in the downstream substation; that is, a power source gets disconnected due to a fault:
  (a) CC does plant wide power calculation
  (b) CC comes up with a load shed priority until which loads have to be shed in that downstream substation and/or other downstream substations
  (c) CC sends calculates load shed priority information over IEC61850
  (d) LC receives the load shed priority and checks which loads priorities are less than or equal to that priority value and issues shed commands to those loads' IEDs on IEC61850.

Contingency Example 2

Upstream and downstream substations are connected or LC and CCs are connected on the Plant-wide LAN on IEC61850 and a contingency occurs in the downstream substation; that is, a circuit breaker that is associated with the substation network changes state (open to close or close to open):
  (a) the LC and CC check, if the circuit breaker status change results in a disintegration/change of the downstream network (b) the downstream substation network segment that is still connected to the upstream substation is 'taken care' by the CC
(c) the islanded part of the substation network is 'taken care' by the LC, (e.g., a part of the downstream substation network is in local control mode (partial autonomous mode))
(d) CC does plant wide power balance calculation and the LC does the power balance calculation for the islanded network in the downstream substation
(e) In case there is a power deficiency in the islanded network, the LC arrives at a load shed priority calculation and checks which loads priorities are less than or equal to the calculated priority value and issues shed commands to those loads' IEDs on IEC61850.

Contingency Example 3

Upstream and downstream substations are connected or LC and CCs are connected on the Plant-wide LAN on IEC61850 and a contingency occurs in the downstream substation; that is, a circuit breaker (tie feeder) connecting the two substations trips on a fault, or LC and CCs are disconnected due to a fault in the IEC61850 communication network or Plant-wide LAN (upstream and downstream substations are still electrically connected)
(a) the LC takes control of the disconnected substation (from the plant network) and the downstream substation Load Shedding mode changes from remote to local mode
(b) CC does plant wide power balance calculation for the rest of the network except the isolated substation.
(c) LC does the power balance calculation for the downstream substation
(d) In case there is a power deficiency in the islanded network (downstream substation), the LC arrives at a load shed priority calculation and checks which loads priority are less than or equal to the calculated priority value and issues shed commands to those loads' IEDs on IEC61850.

Contingency Example 4

One of the IEC61850 interfaces from the CC (towards the LCs) becomes faulty (upstream and downstream substations are still electrically connected)
(a) All the LCs connected on that interface take their respective substations' load shedding functionality into local modes.
(b) The remaining downstream substations' LCs are still considered for the plant wide power balance calculations by the CC.
(c) CC does plant wide power balance calculation for the rest of the network except the isolated substation.
(d) LC does the power balance calculation for the downstream substation
(e) In case there is a power deficiency in the islanded network (downstream substation), the LC arrives at a load shed priority calculation and checks which loads priorities are less than or equal to the calculated priority value and issues shed commands to those loads' IEDs on IEC61850.

Contingency Example 5

The entire CC becomes faulty (upstream and downstream substations are still electrically connected)
(a) All the LCs connected take their respective substations' load shedding functionality into local modes.
(b) LC does the power balance calculation for the downstream substation
(c) In case there is a power deficiency in the islanded network (downstream substation), the LC arrives at a load shed priority calculation and checks which loads priorities are less than or equal to the calculated priority value and issues shed commands to those loads' IEDs on IEC61850.

Contingency Example 6

LC becomes faulty or its IEC61850 interface becomes faulty; (upstream and downstream substations are still electrically connected). Here, the CC declares the entire downstream substation unavailable for Load Shedding and also discards the data from the LC.

As illustrated through various examples, a controller (CC or LC) on detecting a change of state in electrical network or break in communication with another controller is programmed to operate in autonomous mode to ensure better availability of power at a plant and local process area level. As more than one controller is available to cater to power management functions, availability of a controller is better as compared to known systems.

Figure 3:
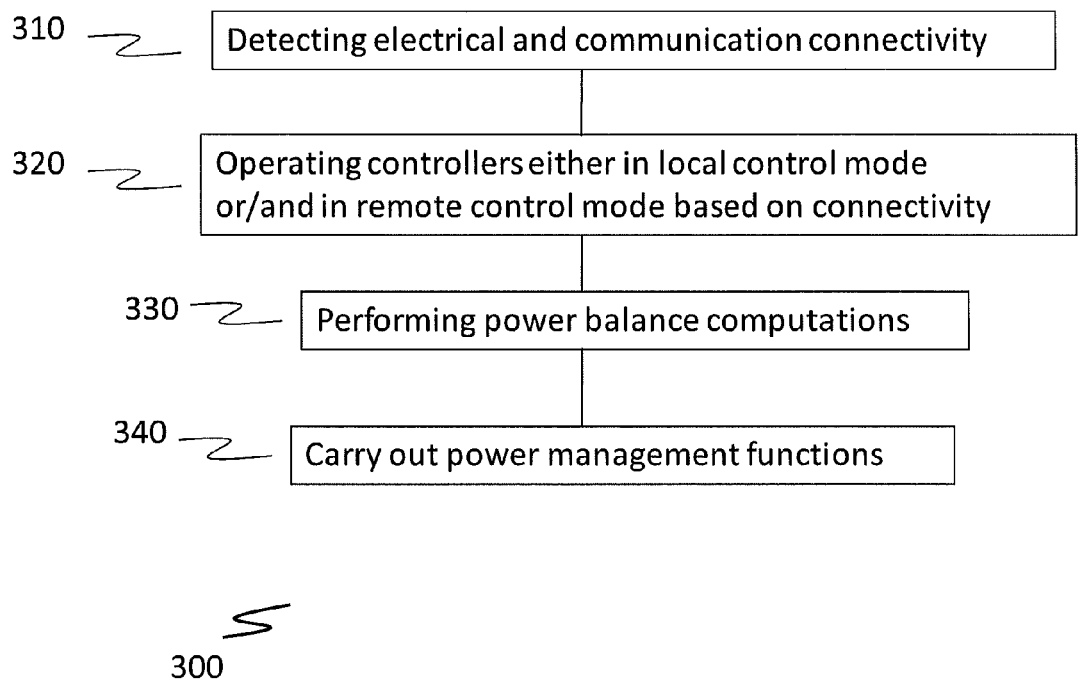
FIG. 3 is a flow chart representation of an exemplary method of power management in accordance with one aspect of the present disclosure.

The central aspect of a power management (load shedding being the exemplary but non-limiting power management functionality) method used by the system 200 of FIG. 2 is described through the flowchart 300 as shown in FIG. 3. As illustrated, at step 310, the controllers (CC and LCs) detect their electrical connectivity status through exchange of electrical network information related to their respective local process areas and communication connectivity status as a result of the communication process between the controllers. At step 320, based on the exchanged network data or/and the connectivity status, the controllers involved in the power management process decide if there is a desire for any one of the controllers to operate in remote control mode or in local control mode. The electrical information exchanged or maintained are either used for power balance computations (remote control mode) or discarded (local control mode) as illustrated in step 330. In local control mode, the power balance calculations at the individual controller are performed as if the electrical network under control of the other controller does not exist. If the electrical information is not to be discarded (remote control mode) then one controller (LC) operates under command of another controller (CC) that does centralized computation for the plant. It is to be noted that each controller (CC and LC) computes to maintain power balance and highest electrical power availability in their respective local process area. As is evident, for a controller the scope/extent definition for power management is dependent on the electrical and communication connectivity. It is re-emphasized here that a central controller (CC) has the entire plant electrical network as its scope for power management with an option of operating the entire or a part of the plant electrical network in conjunction with one or more additional controllers (local controllers).

Figure 4:
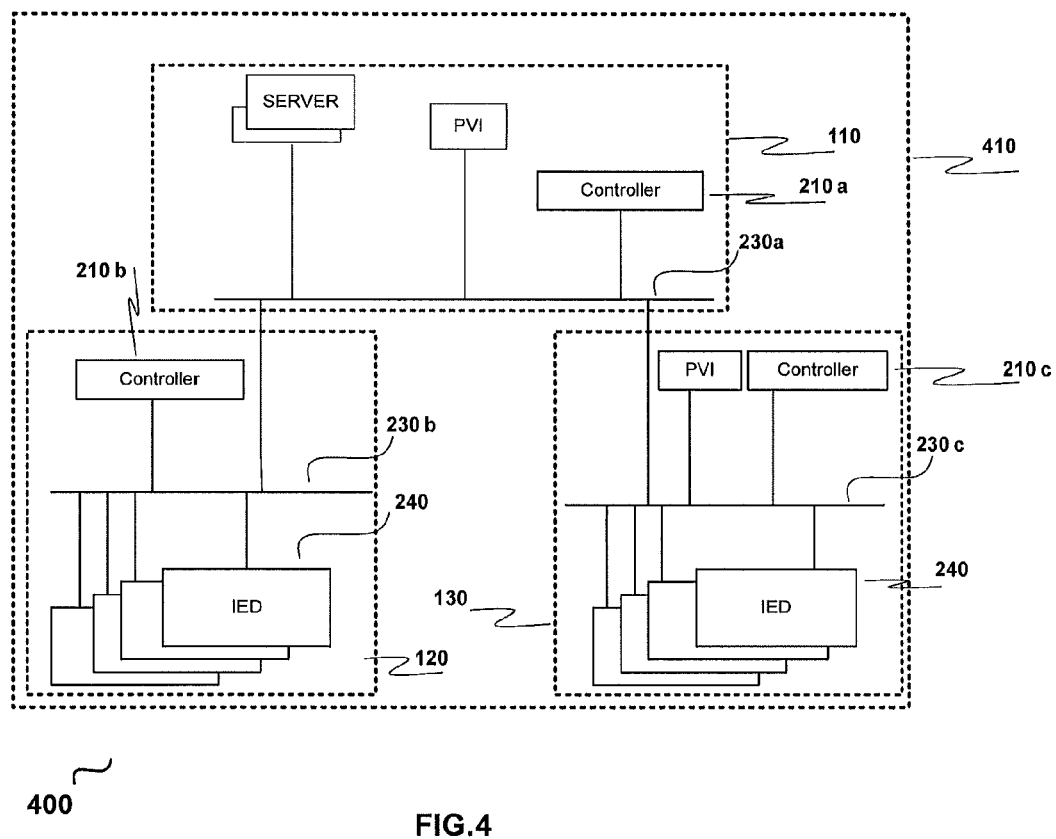
FIG. 4-FIG. 6 are block diagram representations of power management system as additional exemplary embodiments.

It may be noted that the local process area for the CC is depicted as that of the upstream substation (110) as in this area the CC is described to have direct control for power management. However, the CC (210*a*) can have the entire electrical plant network as its scope for the local process area and performs indirect control for power management through one or more local controllers (210*b*, 210*c*) configured in their respective local process areas (120, 130). This aspect is illustrated in the system 400 depicted with FIG. 4. The local process area (410) for the CC is illustrated along with the local process area (110) that includes upstream substation. Here, only the local process area (110) including the upstream substation is under direct control of the CC (210a).

Figure 5:
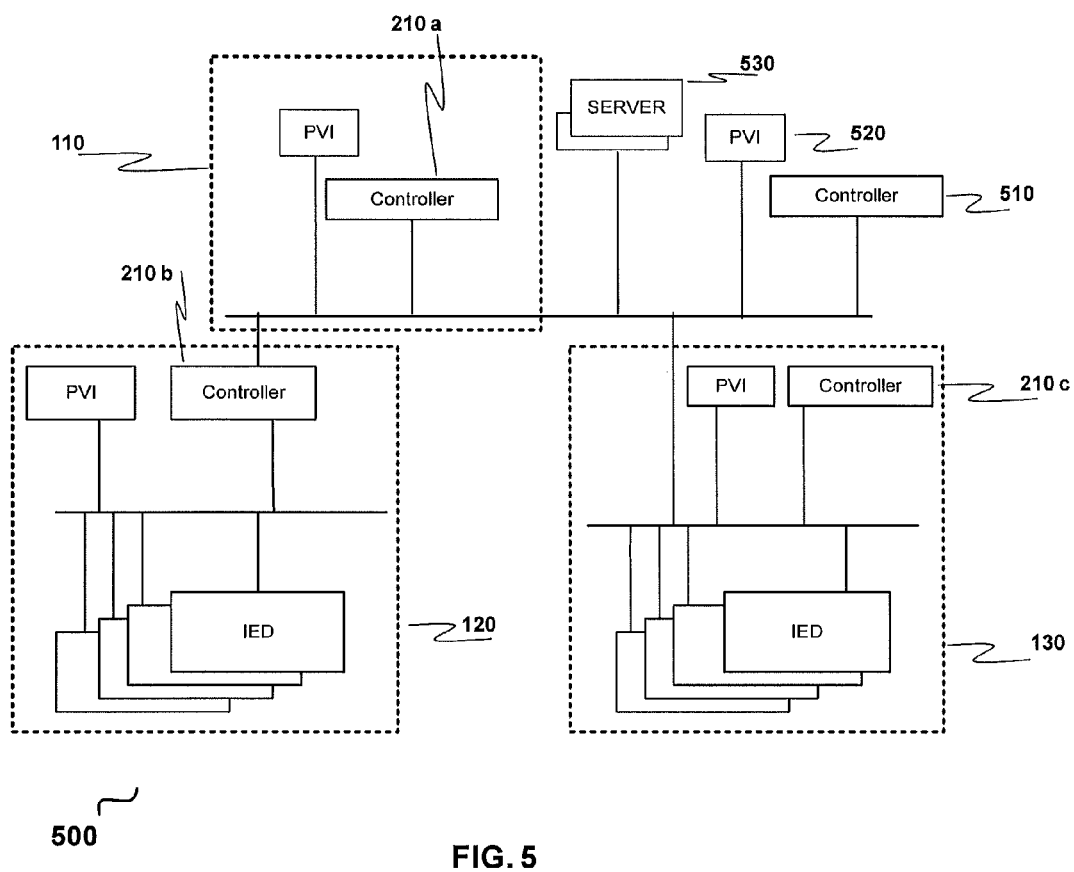

In FIG. 5, the CC (510) is depicted to function only as an independent CC with no direct control in any of the local process areas related to substations. The plant PVI (520) and the servers (530) for plant power management are also depicted outside the local process area of the local controllers (210a, 210b and 210c). This exemplary illustration is made to highlight that the CC may perform power management for the plant electrical network through local controllers in various local process areas. It is again to be noted that the local process area for the CC can be the entire plant electrical network.

Figure 6:
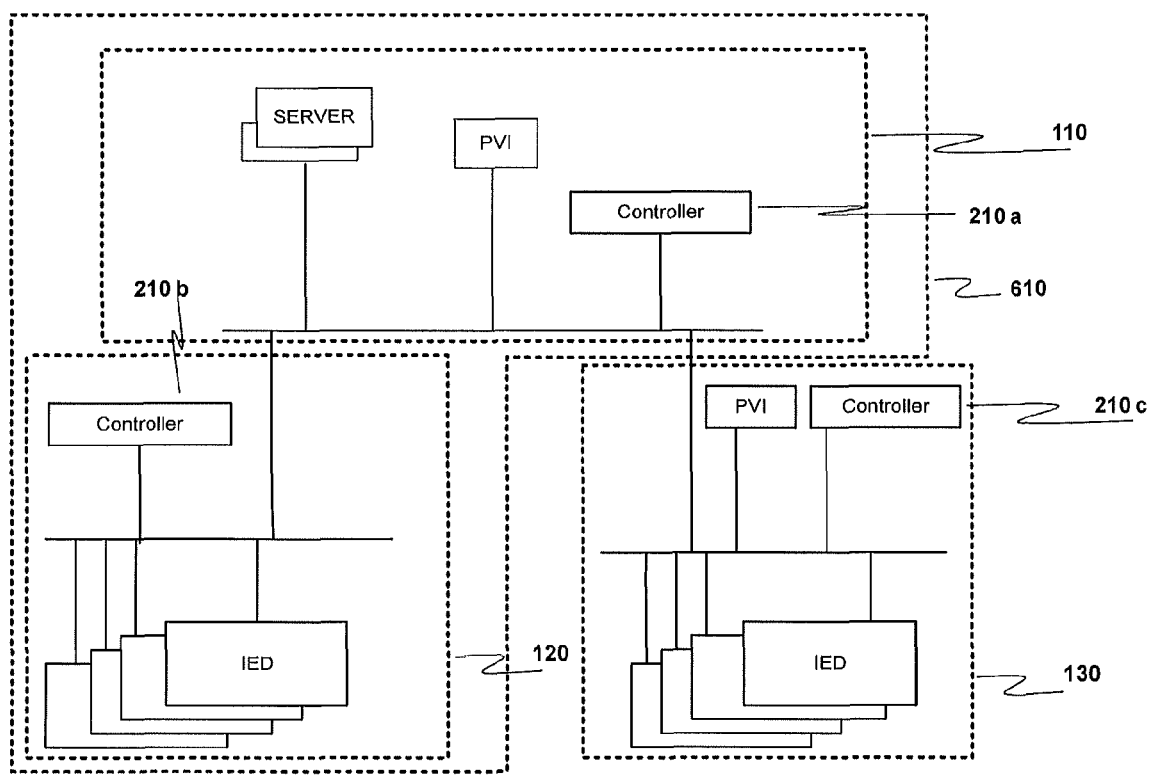

It is also to be recognized that though in exemplary normal conditions, the local process area for the CC is the entire plant electrical network, the CC can be programmed to exclude a particular part of the plant electrical network and the local process area for the CC may dynamic change based on various contingency conditions described through various examples above to exclude a portion of the plant electrical network that is isolated or islanded in the plant electrical network. This aspect is depicted through FIG. 6 that illustrates a different configuration of the local process area (610) for the CC than the local process area (410) covering the entire plant electrical network. This change may be intentional (CC configured or programmed to include only part of the plant electrical network as its local process area) or a result of dynamic activity (e.g. contingency condition) in the plant electrical network.

It will be appreciated by those skilled in the art that the LC transfers control to higher level CC only for the connected local load network configurations. However, in case there is a local island network (e.g., an unconnected island in the downstream substation), the information pertaining to the unconnected island information is discarded for plant-wide power balance calculations by the CC, and the LC handles the load shedding due to the unconnected island in the downstream substation.

In the exemplary embodiments as described herein each LC is therefore configured to carry out power management functions by issuing local commands (like load shedding trip command information) to address the load shedding priorities for one or more local islands in the local load network, where the local island exists due to an isolation of the local load network from the rest of the main power plant network. In other words, the LC takes over control for any load shedding specifications for local islands thus relieving the CC of these tasks. The LC is also configured for setting local load shedding parameters to address the local load shedding priorities in the local process areas.

The maximum number of power network islands that can be handled using the LC as described herein is conceptually limitless, as the CC only has to take care of the islands at the highest voltage level (e.g., plant level islands) and the LCs take care of the local substation islands. In case of formation of local substation islands, the respective LC can act independently without the need of any intervention from the CC. Thus, the reach and functionality coverage in the whole plant is substantially high as compared to the centralized functionality of the known systems.

Further, in an exemplary implementation, each LC is configured to operate in an isolated or autonomous mode (local control mode) when the communication with CC fails or when there is a power disconnection from the upstream substation, but with an infeed of power from other sources like local GTG (Gas Turbine Generator)/STG (Steam Turbine Generator)/DG (Diesel Generator) set, or tie feeder connection from other substations) to the downstream substation. It is reiterated that the LC senses that it should go on an autonomous mode by checking the communication status of itself with the CC and also the power network connectivity between the plant level substation and downstream substation where it is located. Alternatively, it will also be possible for the user to take the LC into autonomous mode in case it is desired by using the local PVI.

According to exemplary aspects of present technique, the load shedding functions at each LC remains activated at all times to cater for local islanded network configurations. Additionally, the functionality to detect overloading of the incoming grid transformers also remains activated in the downstream substation level LCs. Therefore, the local controller is configured to operate at same time in remote control mode in conjunction with the central controller and also in autonomous mode for power management in one or more sections of electrical network associated with its local process area.

It is reiterated that the CC on its part is configured to treat the downstream substations like 'lumped loads' (consolidated priority wise) and CC performs power balance calculations at the overall system/plant level. On a system/plant level disturbance, the CC calculates the system/plant level power balance and issues plant wide or plant level load shedding priorities. These priorities would be received by the individual LCs and they in turn would shed the load/generator or shed the load/generator based on assigned priorities within the substation 'locally'. In other words, the LCs treat the priority information from CC like a local manual load shedding priority directly issued to it.

As would be clear from above description, the CC and LC can communicate with each other to address the load shedding needs of the overall process plant based on power balance principles.

Also, as is clear from the above description, the LC handles the downstream substation load shedding data, and only a consolidated (summarized) electrical network data and available power and the consolidated load power consumption per priority is sent from the LC to the CC. Thus processing load of the system is divided between the LC and CC. As a result of the LC takes care of the priorities within a downstream substation and the CC takes care of the consolidated priorities from the downstream substations, the load shedding priorities' processing load is substantially reduced in the CC resulting in high availability of CC and greater operational flexibility.

Also since the LCs are directly connected to the downstream substation IEDs, the communication loading on the CC is further reduced to a large extent. The CC only needs to communicate to the LCs. As all substation IEDs are connected to their respective LCs over IEC 61850 GOOSE for load shedding I/O data exchange and only the LCs are be connected to the CC, the LC does all the pre-processing of downstream substation LS data before transferring the consolidated LS data to the CC. Also in this manner, the LCs 'hide' the substation configuration and connectivity complexities from the CC, thereby improving and increasing availability levels of the CC.

Referring now to priorities handling at LC and CC, in one exemplary embodiment dynamic load shedding priority assignment is provided for loads/feeders, based on system operational conditions. The priority assignment in another example is done at overall industrial plant level, based on downstream substation priority or based on downstream process loads'/feeders' priority.

In an exemplary embodiment, common load priorities may be defined across the complete industrial plant, that is, between two or many substations, there can be common priorities and load shedding would result in all the substations with common priority on command from the CC. In this manner, the load shedding can be performed in a discrete manner until the lowest possible level in the downstream substation.

Alternately, in case loads are to be shed in some other downstream substations due a disturbance in one of the downstream substations, then load priorities can be defined, and these can be referred to herein as "pre-identified load priorities". Priorities can thus be tailored to maximize efficiency of the load shedding system. Each LC in one exemplary implementation may have a local priority assigned for its corresponding local process area at the CC and load shedding is done on the basis of such assignment. Having a priority assignment scheme according to operational conditions, results in functionality termed as 'Flexible Auto Update of Priorities' that is implemented in the LC in an exemplary embodiment.

As mentioned earlier, all substation IEDs communicate information desired for load shedding to their respective LC over OCS. The substation(s) LCs further communicate the local substation load shedding information to the CC, also using OCS. It may be noted that the LC does all the pre-processing based on power balance calculations of downstream substation data before transferring the consolidated prioritized data to the CC.

Exemplary aspects of the present technique advantageously achieve "Fast Load Shedding", "Slow Load Shedding" and "Manual Load Shedding" modes as explained below, based on plant level and downstream load shedding functionalities. The "Fast Load Shedding" mode is activated based on trip of power sources or change of network 'defining' circuit breakers in upstream or downstream substations. Manual Load Shedding is based on issuing of local load shedding commands using a manually fed manual priority for local loads. Manual Load Shedding is based at both CC and LC levels. At the CC level, the user enters the load priority or the power information for desried load shedding actions across the entire plant network including downstream substations), using the plant level PVI. If Manual LS is to be initiated at the LC level, the user enters the load priority or the power information or desried load shedding actions in the downstream substation, using the local PVI. It may be noted that here that in known systems there is no information regarding load shedding function at the downstream substation due to a lack of HMI function at the downstream substation. Hence, the only way to know the load shedding status from the downstream substation in the known systems is from the HMI associated with the Central Controller. The exemplary method and system disclosed herein can overcome this limitation and the user can monitor and parameter the downstream substation load shedding function from the substation itself.

The exemplary technique can also achieve "Slow Load Shedding" based on overload of a transformer connecting the downstream substation to the upstream substation. The Slow Load Shedding Mode can be especially advantageous in case of overloading (acting over a period of time, based on overload levels) on downstream transformers. In this situation the Slow Load Shedding Mode is activated and the LC sheds loads in the downstream substation. Thus, a swift correction of the transformer overload condition and load balancing in the downstream substation is achieved by the LC. Because of the presence of the Slow Load Shedding mode in the LC, a permissive overloading condition (for limited time duration) can be permitted on the downstream substation transformer, thereby avoiding the need to do load shedding. The permissive overloading condition is based on different parameters including but not limited to ambient temperature, status of outgoing feeders on the bus bar etc. Thus, load shedding can be avoided in a situation where the downstream transformers can be 'overdriven' based on permissive (based on current loading levels and transformer capacity to get overloaded) overloading condition thereby increasing system availability.

These three modes or functions, Fast Load Shedding, Slow Load Shedding and Manual Load Shedding are useful in power management for the process plant and ensure maximum operational availability of different equipments in the power network of both upstream and downstream substations.

As would be appreciated by those skilled in the art, mainly the hierarchical concept of central and local load shedding, is explained herewith as an exemplary embodiment. However, this hierarchical concept is not limited to load shedding function alone and may be extended to power management itself leading to greater efficiency and optimization of the power management systems deployed in various industries, utilities, and residential environments.

It is also stated that although the hierarchical concept is illustrated with two levels of hierarchy (e.g., one CC (first level) and LC (second level) connected in an hierarchical manner), the concept is extendable to have more than two levels of hierarchy (e.g., one CC (first level) in combination to one LC (second level)) connected to one or more LC in sub levels (third level, fourth level and so on as per the need) where the electrical network data from sub level LCs are consolidated by the LC/CC hierarchically above the sub level LCs.

It would also be appreciated by those skilled in the art that though mostly the hierarchical concept of central and local load shedding is explained herewith as an exemplary embodiment, electrical network information exchange, computations related to power management functions and operation (control) are not limited to the controllers operating strictly in hierarchical manner. These may also result between any two controllers deployed to manage substations arising in architecture that are distributed or hybrid (distributed at same level and hierarchical with reference to a particular level).

While only certain features of the invention have been illustrated and described herein, many modifications and changes will occur by those skilled in the art. It is, therefore, to be understood that the appended claims are intended to cover all such modifications and changes as fall within the true spirit of the invention.

As such, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:
1. A power management system for a plant electrical network including power distribution equipment, power actuators, local generators and loads of an industrial plant, the system comprising:
   a plant-wide communication network; and
   a plurality of controllers for power management in the plant electrical network,
   wherein the plurality of controllers are communicatively interconnected via the plant-wide communication network, wherein a first controller from the plurality of controllers is configured for power management in a first local process area within the plant electrical network by controlling power distribution equipment in the first local process area, wherein at least a second controller from the plurality of controllers is configured for power management in a second local process area within the plant electrical network by controlling power distribution equipment in the second local process area, wherein at least one controller of the first controller and the second controller is configured to operate according to an operation mode determined based on at least one of (i) collected electrical connectivity status between the first local process area and the second local process area in the plant electrical network, and (ii) communication connectivity status information between the first controller and the second controller on the plant wide communication network, wherein the at least one controller is configured to perform power balance computations for the respective local process area in accordance with the operation mode of the at least one controller, wherein the at least one controller is configured to perform the power management in the respective local process area based on the results of the power balance computations by providing commands for load shedding of the power distribution equipment in the respective local process area to maintain a power balance condition in the respective local process area, and wherein the at least one controller is configured to perform the power management based on priority definitions associated with loads in the respective local process area.

2. The power management system of claim 1, wherein the first controller from the plurality of controllers is configured as a central controller for the plant electrical network, communicatively connected to any controllers from the plurality of controllers that are configured for power management in respective local process areas within the plant electrical network.

3. The power management system of claim 2, wherein the central controller is configured to perform power management based on priorities assigned with local process areas.

4. The power management system of claim 2, wherein the central controller is configured to communicate one or more power management commands to the second controller from the plurality of controllers.

5. The power management system of claim 1, wherein at least one controller from the plurality of controllers is configured as a local controller in a local process area for a power management function in the respective local process area, and is configured to operate in an operation mode which is determined to be one of a remote control mode, a partial autonomous mode, and a complete autonomous operation mode.

6. The power management system of claim 1, wherein at least one controller from the plurality of controllers is configured for a local process area that includes an electrical network existing as an islanded or as an isolated network.

7. The power management system of claim 1 wherein the power management comprises:

one or more power management functionalities for load shedding including at least one of slow load shedding, manual load shedding, power balance computations, issuance of priorities, and consolidating load power consumption per priority to carry out a power management function.

8. The power management system of claim 1, wherein at least one controller from the plurality of controllers is configured to perform power management functionalities based on priority communication in the plant-wide communication network.

9. The power management system of claim 1, comprising:

at least one process visualizing interface associated with the first and/or second controller for providing priority configuration and manual functions for power management in the plant electrical network.

10. The power management system of claim 1, wherein the first controller from the plurality of controllers and the second controller are distributed in two different hierarchical levels in the plant electrical network.

11. The power management system of claim 1, wherein the first controller from the plurality of controllers and the second controller are distributed in the same hierarchical level in the plant electrical network.

12. The power management system of claim 1, wherein a scope of a local process area for at least one controller from the plurality of controllers is defined in or inferred from device configuration files of the at least one controller.

13. The power management system of claim 1, wherein a scope of a local process area for at least one controller from the plurality of controllers dynamically changes based on contingency conditions in the plant electrical network.

14. The power management system of claim 1, wherein local process areas of at least two controllers from the plurality of controllers are disjoint to each other.

15. The power management system of claim 1, wherein the first local process area controlled by the first controller includes at least one other local process area controlled by a controller from the plurality of controllers in the plant electrical network.

16. The power management system of claim 1, wherein at least one controller from the plurality of controllers is configured to perform slow load shedding for at least one load in the respective local process area of the at least one controller.

17. The power management system of claim 1, wherein at least one controller from the plurality of controllers is configured to perform manual load shedding for at least one load in the respective local process area of the at least one controller.

18. The power management system of claim 1, wherein at least one controller from the plurality of controllers is configured to perform at least one power management function in the respective local process area of the at least one controller based on a communication received in the plant-wide communication network.

19. A method for power management in a plant electrical network including power distribution equipment, power actuators, local generators and loads of an industrial plant, using at least two controllers communicatively interconnected via a plant-wide communication network, each of the at least two controllers being respectively configured for power management in a corresponding local process area within the plant electrical network, the method comprising:

(a) deciding an operation mode for at least one controller from the at least two controllers as (a) a remote control mode or (b) a complete autonomous mode or (c) a partial autonomous mode for power management in the corresponding local process area of the at least one controller, wherein the operation mode is decided based on at least one of (i) collected electrical connectivity status between the corresponding local process areas of the at least two controllers in the plant electrical network, and (ii) communication connectivity status information between the at least two controllers on the plant-wide communication network;

(b) performing power balance computations for the corresponding local process area by the at least one controller in accordance with the operation mode of the at least one controller; and (c) performing the power management in the corresponding local process area associated with the at least one controller based on results of the power balance computations by providing commands for load shedding of power distribution equipment in the corresponding local process area to maintain a power balance condition, wherein the power management is further based on priority definitions associated with loads in the corresponding local process area of the at least one controller.

20. The method for power management of claim 19 wherein determining the operation mode for the at least one controller comprises:

detecting at least one of (a) a communication connectivity status between the at least two controllers, or (b) an electrically connectivity status between the corresponding local process areas associated with the at least two controllers, or (c) information received from an other controller of the at least two controllers, or (d) one or more user inputs provided through a process visualization interface, or (e) from any combinations of (a), (b), (c) and (d).

21. The method for power management of claim 19, comprising:

initiating the step of performing power balance computations by the at least one controller on (a) detecting change in the operation mode, or (b) detecting a system disturbance in the corresponding local process area, or (c) for providing consolidated electrical network information to the at least one controller.

22. The method for power management of claim 19, wherein the step of performing power management by the at least one controller comprises:

performing at least one function from functions for (a) load shedding based on load shedding priorities, (b) power control based on priority for generator, and (c) power restoration based on reconnecting priority for a load.

* * * * *